United States Patent
Venturi et al.

(10) Patent No.: US 12,466,135 B2
(45) Date of Patent: Nov. 11, 2025

(54) ACTUATOR FOR THREE-DIMENSIONAL PRINTING SYSTEM

(71) Applicant: NISSAN NORTH AMERICA, INC., Franklin, TN (US)

(72) Inventors: Federico Venturi, Sugar Land, TX (US); Nanzhu Zhao, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 85 days.

(21) Appl. No.: 18/590,714

(22) Filed: Feb. 28, 2024

(65) Prior Publication Data

US 2025/0269602 A1   Aug. 28, 2025

(51) Int. Cl.

| | |
|---|---|
| B29C 64/227 | (2017.01) |
| B29C 64/124 | (2017.01) |
| B29C 64/245 | (2017.01) |
| B29C 64/255 | (2017.01) |
| B29C 64/393 | (2017.01) |
| B33Y 30/00 | (2015.01) |
| B33Y 50/02 | (2015.01) |

(52) U.S. Cl.
CPC ......... B29C 64/393 (2017.08); B29C 64/124 (2017.08); B29C 64/245 (2017.08); B29C 64/255 (2017.08); B33Y 30/00 (2014.12); B33Y 50/02 (2014.12)

(58) Field of Classification Search
None
See application file for complete search history.

(56) References Cited

U.S. PATENT DOCUMENTS

| | | | |
|---|---|---|---|
| 9,381,701 B1* | 7/2016 | Dufort | B33Y 50/02 |
| 2007/0248892 A1* | 10/2007 | Rangelow | G03F 9/7042 |
| | | | 430/30 |
| 2018/0085777 A1* | 3/2018 | Sakai | B05C 11/1034 |
| 2019/0134888 A1* | 5/2019 | DeSimone | B29C 64/40 |
| 2019/0202116 A1 | 7/2019 | Hsu | |
| 2019/0291340 A1* | 9/2019 | Medalsy | B29C 64/264 |
| 2020/0055251 A1* | 2/2020 | Medalsy | B29C 64/20 |
| 2020/0130262 A1* | 4/2020 | Theodet | G03F 7/2012 |
| 2021/0387420 A1* | 12/2021 | Greene | B29C 64/282 |

(Continued)

FOREIGN PATENT DOCUMENTS

| | | | | |
|---|---|---|---|---|
| CN | 108995204 A | * | 12/2018 | ........... B29C 64/112 |
| CN | 109454868 A | * | 3/2019 | ............ B29C 64/20 |
| JP | 2613928 B2 | * | 5/1997 | ........... B29C 64/135 |

OTHER PUBLICATIONS

Xeryon, Piezo actuators: applications, types and(dis)advantages, https://xeryon.com/piezo-actuators-applications-and-types/, Mar. 3, 2024 (Year: 2024).*

(Continued)

*Primary Examiner* — Yung-Sheng M Tsui
(74) *Attorney, Agent, or Firm* — Global IP Counselors, LLP (57) ABSTRACT

A three-dimensional printing system includes a tank containing a liquid photopolymer resin. An arm is configured to be movable relative to the tank. A rigid base is connected to the arm. A light source is configured to emit light to the tank to form an object on the rigid base. An actuator is connected to at least one of the build plate and the tank. The actuator is configured to deform when power is supplied to the actuator.

20 Claims, 7 Drawing Sheets

(56) References Cited

U.S. PATENT DOCUMENTS

| | | | |
|---|---|---|---|
| 2022/0176622 A1* | 6/2022 | Lin | B29C 64/20 |
| 2022/0194003 A1* | 6/2022 | Goldman | B33Y 30/00 |
| 2022/0219381 A1 | 7/2022 | Cormier et al. | |
| 2024/0140030 A1* | 5/2024 | Lin | B29C 64/223 |

OTHER PUBLICATIONS

ElProCus, What is a Piezoelectric Actuator: Working & Its Applications, https://www.elprocus.com/piezoelectric-actuator/, Oct. 3, 2023 (Year: 2023).*

* cited by examiner

ACTUATOR FOR THREE-DIMENSIONAL PRINTING SYSTEM

BACKGROUND

Technical Field

The present disclosure generally relates to a three-dimensional printing system. More specifically, the present disclosure relates to an actuator for a three-dimensional printing system.

Background Information

Three-dimensional (3D) printing is the construction of a three-dimensional object from a digital file, such as a CAD model or a digital 3D model. The objects are printed layer by layer by the 3D printing system by curing portions of a light curable photopolymer resin layer by layer, one layer at a time, within a printing area of a tank filled with the photopolymer resin. A curing device, such as an ultraviolet light source, is projected through a transparent substrate, window or bottom wall of the tank curing each layer of the object on a build plate, or rigid base, that is initially at least partially submerged within the photopolymer resin. The build plate is incrementally raised upward as each layer is cured thereon.

When the build plate is raised to print the next layer, a resin void is left between the build plate and the transparent window. The resin void results in a lack of resin supply, which reduces a printing speed. When larger parts are being printed, the larger cross-sectional areas require an increased resin supply.

Printing a high strength polymer requires a high viscosity resin, which has a slower flow rate. The slower flow rate results in an increased amount of time required to fill the resin void, which reduces the printing speed.

SUMMARY

A need exists for an improved three-dimensional printing system in which an actuator is configured to deform when power is supplied thereto. The deformation of the actuator facilitates resin flow in the tank.

In view of the state of the known technology, one aspect of the present disclosure is to provide a three-dimensional printing system. The three-dimensional printing system includes a tank containing a liquid photopolymer resin. An arm is configured to be movable relative to the tank. A rigid base is connected to the arm. A light source is configured to emit light to the tank to form an object on the rigid base. An actuator is connected to at least one of the build plate and the tank. The actuator is configured to deform when power is supplied to the actuator.

Also other objects, features, aspects and advantages of the disclosed actuator for a three-dimensional printing system will become apparent to those skilled in the art from the following detailed description, which, taken in conjunction with the annexed drawings, discloses exemplary embodiments of an actuator for a three-dimensional printing system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
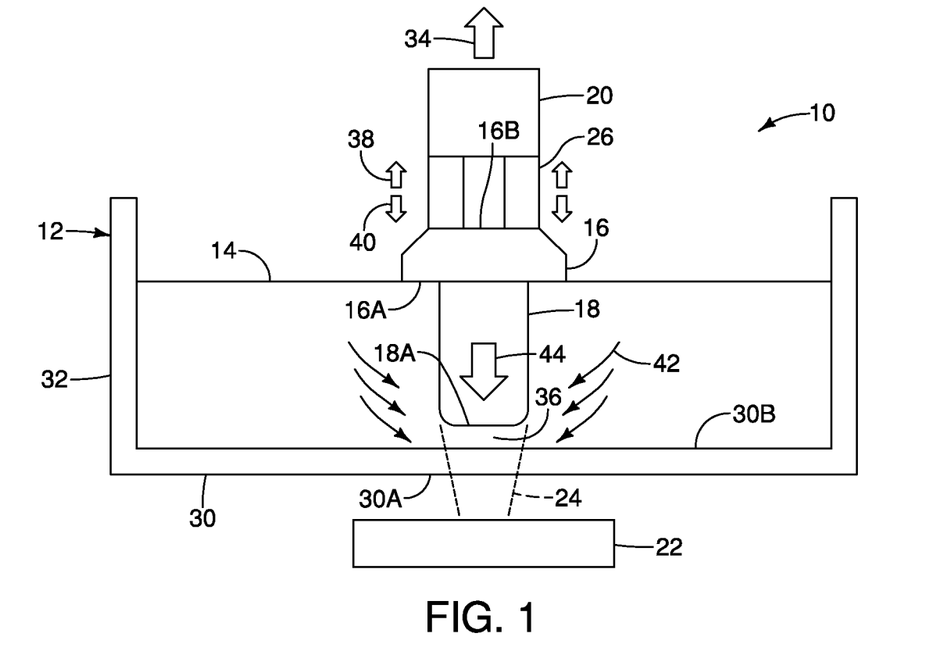
FIG. 1 is an elevational view of a three-dimensional printing system including an actuator connected between an arm and a rigid base in accordance with an exemplary embodiment.
Figure 2:
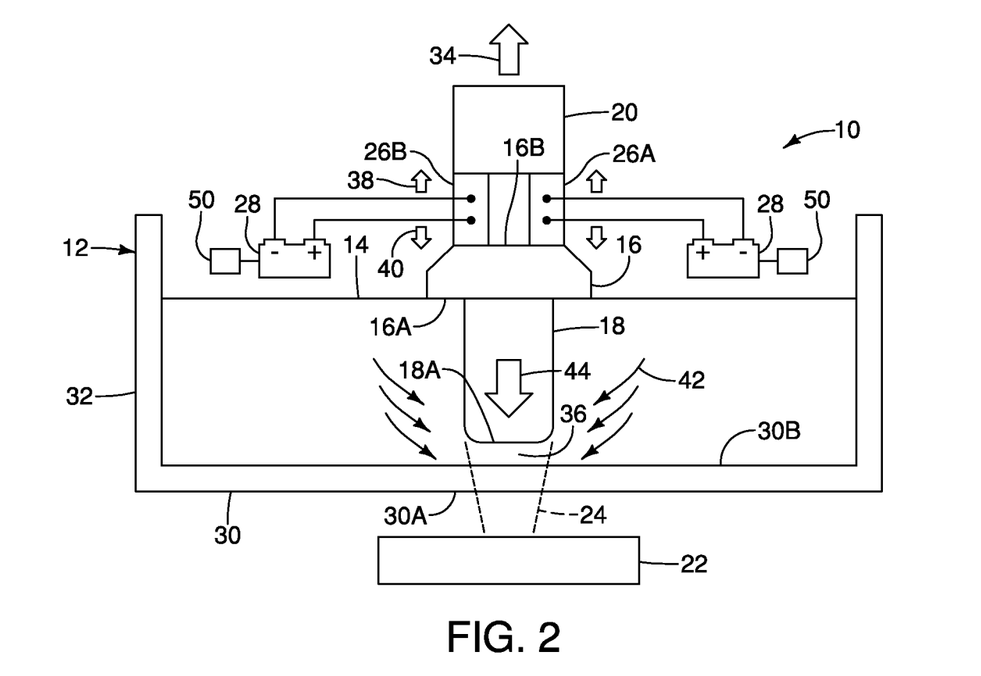
FIG. 2 is an elevational view of the three-dimensional printing system of FIG. 1 including a power source connected to the actuator.

Referring initially to FIG. 1, three-dimensional (3D) printing system 10 in accordance with an exemplary embodiment includes a tank 12 that contains a liquid photopolymer resin 14. The 3D printing system 10 further includes a rigid base 16 on which an object 18 is to be printed and a control arm 20 connected to the rigid base 16. The rigid base 16 has a print surface 16A on which the object 18 is configured to be printed, as shown in FIG. 1. The control arm 20 is connected to the rigid base 16 to move the rigid base 16 relative to the tank 12. A light source 22 is configured to emit light 24 to the tank 12 to form the printed object 18 on the rigid base 16. An actuator 26 is connected to at least one of the rigid base 16 and the tank 12. The actuator 26 is configured to deform when power is supplied to the actuator 26 from a power source 28, as shown in FIG. 2.

The tank 12 contains the liquid photopolymer resin 14, as shown in FIG. 1. The tank 12 can be any suitable shape to hold the liquid polymer resin 14 therein, such as rectangular or circular. The tank 14 has a base 30 and a side wall 32 extending upwardly from the base 30. The base 30 is preferably transparent such that the light 24 emitted from the light source 22 passes through the base 30. The entirety of the base 30 can be transparent, or a portion of the base 30 can be transparent. The transparent portion of the base 30 constitutes an optically transparent window 30A through which the emitted light 22 is configured to pass.

The rigid base, or build platform, build plate or print bed, 16 provides the surface 16A on which the object 18 is printed. The print surface 16A is preferably a planar surface, as shown in FIG. 1. The rigid base 16 can be made of any suitable material, such as plastic, such as polyactic acid (PLA), or glass. The rigid base 16 is connected to the control arm 20.

Figure 6:
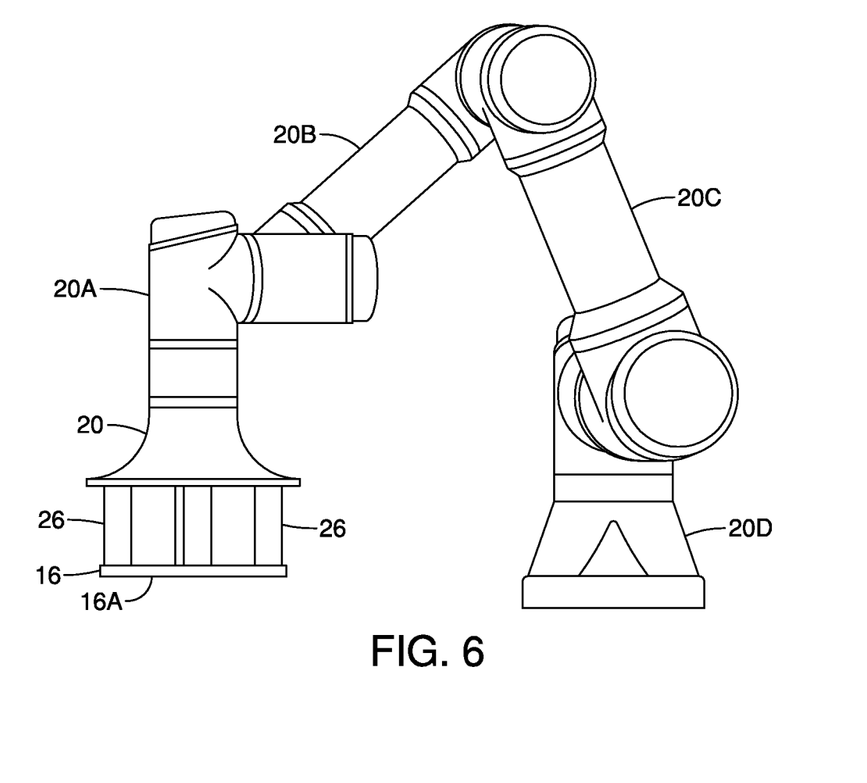
FIG. 6 is a perspective view of an actuator disposed between a rigid base and an arm of the three-dimensional printing system of FIG. 1.

The control arm 20 is connected to the rigid base 16 to control movement and positioning of the rigid base 16 during the printing process. The control arm 20 is connected to the rigid base 16 to move the rigid base 16 relative to the tank 12. In other words, the arm 20 is configured to be movable relative to the tank 12 such that the movement of the arm 20 moves the rigid base 16. The control arm 20 includes a plurality of links 20A, 20B, 20C and 20D, as shown in FIG. 6, independently movable relative to each other to provide highly accurate positioning of the rigid base 16. Although the control arm 20 is shown with four links 20A, 20B, 20C and 20D, the control arm 20 can have any suitable number of links 20. The control arm 20 preferably has six degrees of freedom, such that the rigid base 16 can move through a curvilinear path to more accurately print the object 18. The control arm 20 is preferably a robotic arm having six degrees of freedom. The six degrees of freedom are movements along the three axes (i.e., the X, Y and Z axes), and rotation about each of the three axes (i.e., pitch, roll and yaw). Providing the control arm 20 with multiple degrees of freedom, such as six degrees of freedom, allows the control arm 20 to move the rigid base 16 through a curvilinear path, including moving the rigid base 16 to a plurality of positions, thereby allowing a more accurate object 18 to be printed.

The liquid polymer resin 14 is selectively cured by light-activated polymerization, such as by photopolymerization, which preferably uses visible or UV light, although light having any suitable wavelength can be used, to form in situ cross-linked polymer structures. The liquid polymer resin 14 preferably includes monomer and oligomer molecules that are converted to solid polymers during photopolymerization when the light 24 emitted by the light source 22 is guided through the transparent portion, or the optically transparent window 30A, of the base 30 of the tank 12.

The light source 22 emits light 24 to cure the liquid polymer resin 14 in the tank 12, as shown in FIG. 1. The light source 21 preferably emits UV light 24 having a wavelength between approximately 10 and 400 nanometers, inclusive. Preferably, the emitted UV light 24 has a wavelength between approximately 380 and 400 nanometers, inclusive. Light having any suitable wavelength can be used, such as, but not limited to, UV, visible and infrared light.

As shown in FIG. 1, the printed object 18 is formed on the surface 16A of the rigid base 16. The printed object 18 is based on a model supplied to a computer (not shown) that controls the 3D printing process. The light 24 emitted from the light source 24 is guided to the tank 12 to cure the liquid polymer resin 14 on the surface 16A of the rigid base 16 to form a first layer of the printed object 18. The control arm 20 is connected to the rigid base 1 to move the rigid base 16 relative to the tank 12 in a direction indicated by arrow 34 away from the optically transparent window 30A of the base 30. The rigid base 16 is moved a distance approximately equal to a thickness of the formed layer. The light 24 is emitted from the light source 22 to cure the liquid polymer resin 14 in the tank 12 to form a second layer on the first layer. This process is repeated until the entire object is printed. When the printing is complete, the printed object 18 can be removed from the print surface 16A of the rigid base 16.

The transparent window 30A of the base is optically transparent such that focused beams of light 24 emitted from the light source 22 pass therethrough and at predetermined areas or portions of the polymerizable resin 14 located within a printing area 36. The printing area 36 is defined as the space below the rigid base 16 (at and/or below a lower surface 18A of the object 18 being printed) and the upper surface 30B of the transparent window 30A.

As shown in FIGS. 1-8, the actuator 26 is connected between the rigid base 16 and the arm 20. The actuator 26 is preferably a piezoelectric stack, although the actuator can be any suitable actuator configured to move the rigid base 16 relative to the arm 20. The piezoelectric stack 26 is a conventional structure including a plurality of piezo elements layered on top of one another to form the piezoelectric stack. The piezoelectric stack 26 is preferably configured to deform, or elongate, between approximately 30 and 100 microns, inclusive, when power is supplied to the piezoelectric stack. The piezoelectric stack 26 is preferably rated for a pull force between approximately 50 and 100 newtons, respectively.

The piezoelectric stack 26 is connected between an upper surface 16B of the rigid base 16 and the control arm 20, as shown in FIG. 1, in any suitable manner, such as with an adhesive or by a threaded connection. The piezo elements of the piezoelectric stack 26 can be any suitable material including, but not limited to, lead zirconium titanate, barium titanate, and bismuth scandium lead titanate (BSPT, $BiScO_3$—$PbTiO_3$). The piezoelectric stack 26 is configured to provide precision deformation and a large force, such that the resulting movement of the rigid base 16 and/or the tank 12 can be controlled.

Figure 7:
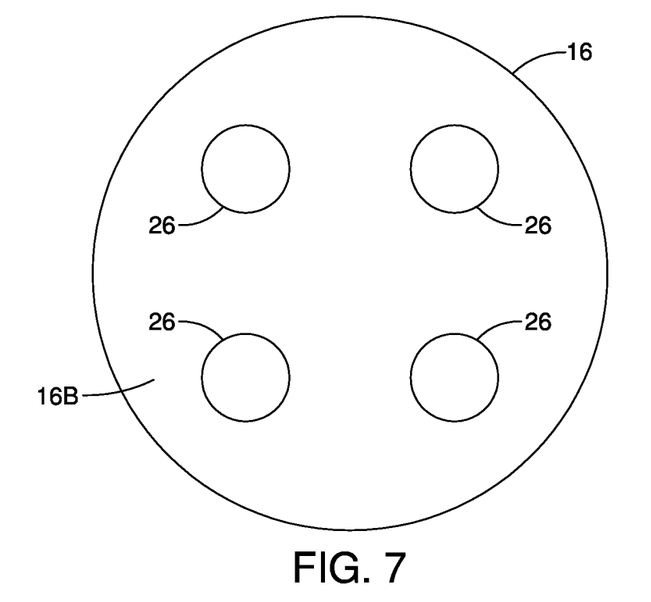
FIG. 7 is a top plan view of a rigid base including a first plurality of actuators.
Figure 8:
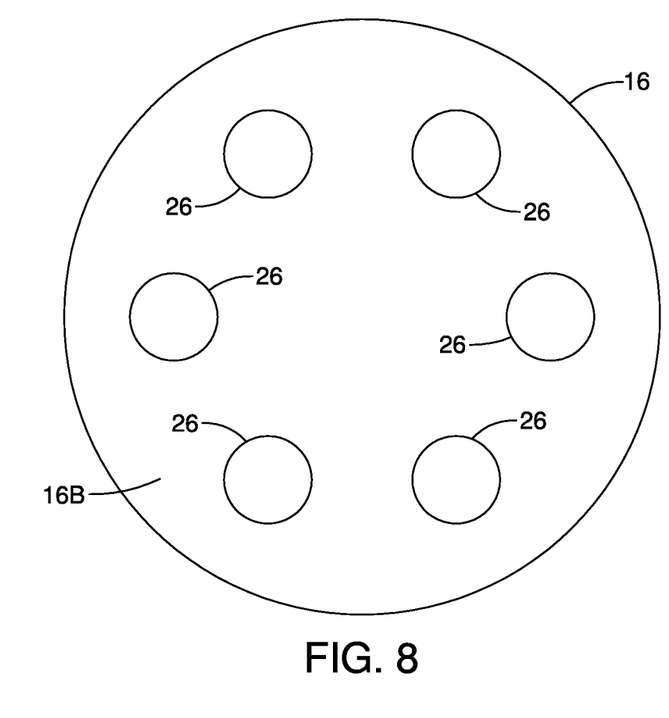
FIG. 8 is a top plan view of a rigid base including a second plurality of actuators.
Figure 9:
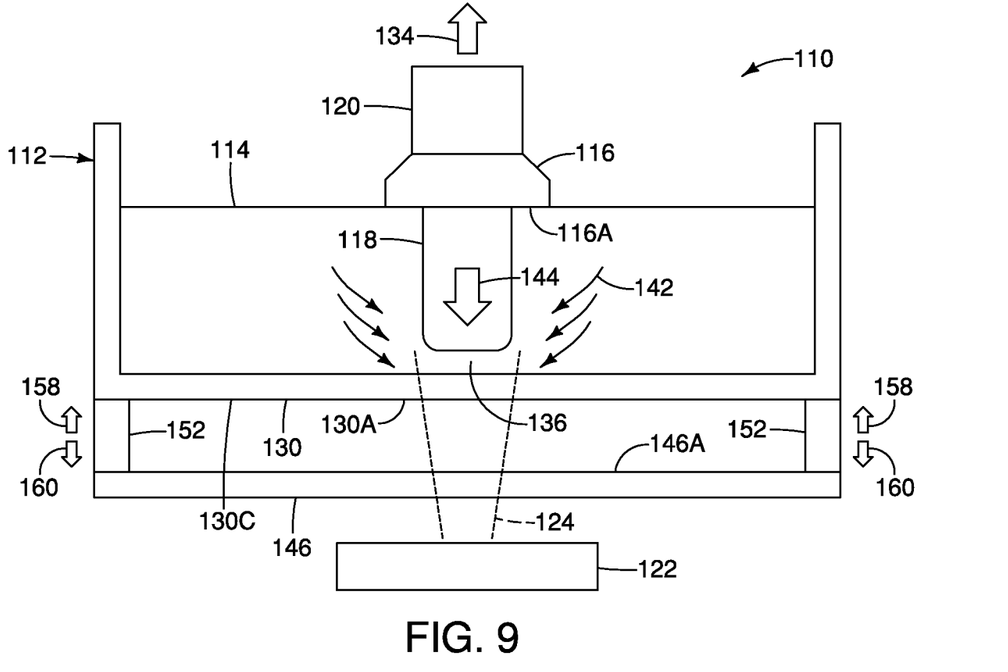
FIG. 9 is an elevational view of a three-dimensional printing system including an actuator connected to a tank in accordance with another exemplary embodiment.

Any suitable number of piezoelectric stacks 26 can be connected between the rigid base 16 and the control arm 20. As shown in FIG. 7, four piezoelectric stacks 26 are connected between the upper surface 16B of the rigid base 16 and the control arm 20 (FIG. 6). As shown in FIG. 8, six piezoelectric stacks 26 are connected between the upper surface 16B of the rigid base 16 and the control arm 20 (FIG. 6). The piezoelectric stacks 26 are preferably disposed around an outer periphery of the upper surface 16B of the rigid base 16 to provide greater movement of the rigid base 16 when deforming the piezoelectric stacks 26. The number of the piezoelectric stacks 26 can be based on a final weight of the object 18 to be printed.

A power source 28 is electrically connected to each piezoelectric stack 26, as shown in FIGS. 2-5. Supplying a voltage to the piezoelectric stack 26 from the power source 28 causes a deformation of the piezoelectric stack 26. The power source 28 is any suitable power source, such as a 120V battery. A controller 50 is connected to each power source 28 to control the supply of power to the piezoelectric stack 26. Alternatively, a single controller 50 can be connected to all the piezoelectric stacks 26.

Figure 3A:
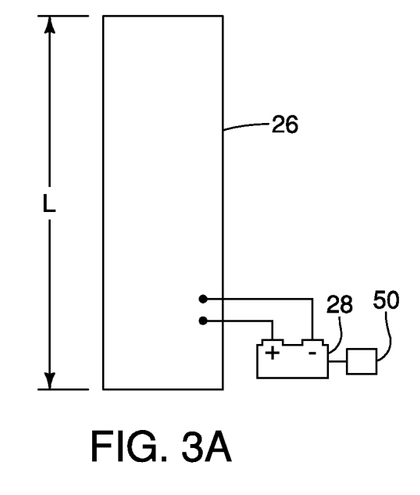
FIGS. 3A and 3B are elevational views of an actuator before and after deformation, respectively.
Figure 3B:
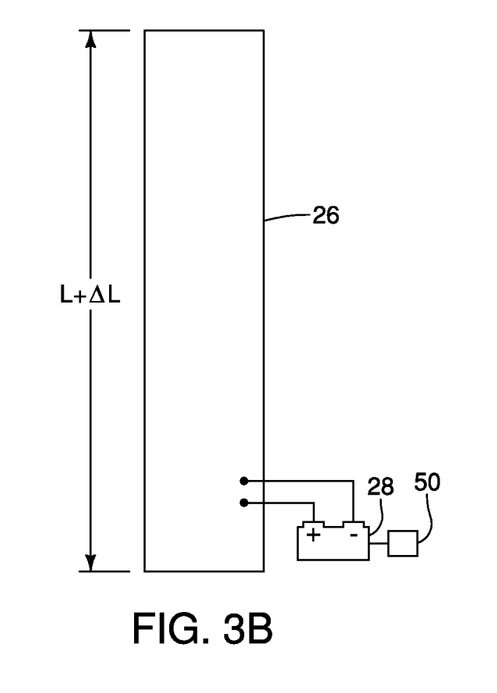

As shown in FIG. 3A, the piezoelectric stack 26 has a length L when a voltage is not supplied to the piezoelectric stack 26. When a voltage is supplied form the power source 28 to the piezoelectric stack 26, the piezoelectric stack 26 deforms by a length ΔL, such that the total length of the deformed piezoelectric stack 26 is L+ΔL, as shown in FIG. 3B. The deformation of the piezoelectric stack 26, as shown in FIG. 3B, is in a longitudinal direction of the piezoelectric stack. As shown in FIGS. 1, 2, 4 and 5, the piezoelectric stack deforms in a first direction indicated by the arrow 40 when voltage is supplied, and retracts in a second direction indicated by an arrow 38 when the supply of voltage to the piezoelectric stack is stopped. In other words, supplying voltage deforms the piezoelectric stack by the longitudinal distance ΔL, and stopping the voltage supply returns the piezoelectric stack to the original, or default, length L. The piezoelectric stack 26 having the length L, as shown in FIG. 3A, is a first position of the piezoelectric stack 26. The piezoelectric stack 26 having the length L+ΔL, as shown in FIG. 3B, is a second position of the piezoelectric stack. Each of the plurality of piezoelectric stacks 26 is configured to deform a predetermined distance, i.e., ΔL, from a first position shown in FIG. 3A to a second position shown in FIG. 3B when power is supplied thereto. Each of the piezoelectric stacks 26 is configured to return from the second position (FIG. 3B) to the first position (FIG. 3A) when the supply of power is stopped. Each of the piezoelectric stacks 26 is configured to be independently controllable by having an independent power supply 28 connected thereto.

As shown in FIG. 1, a suction force, indicated by arrow 44, is generated between the printed object 18 and the base 20 of the tank 12, which must be overcome to move the rigid base 16 upwardly to print the next layer on the printed object 18. Printed objects 18 having a larger cross sectional area generate a larger suction force 44. A resin void is generated in the print area 36 by the upward movement of the rigid base 16. The resin 14 in the tank flows toward the resin void, as indicated by the arrows 42. A lack of resin 14 quickly filling the resin void creates pressure on the printed object 18, which can damage or negatively impact the printed object 18. Decreased resin flow reduces the printing speed. The printed object 18 can also be damaged or otherwise negatively impacted by insufficient resin in the printing area 36 when printing the next layer of the object 18. To print a high strength polymer, higher viscosity resins are used. The increased viscosity of the resin 14 further reduces the flow rate of the resin 14 to fill the resin void.

Figure 4:
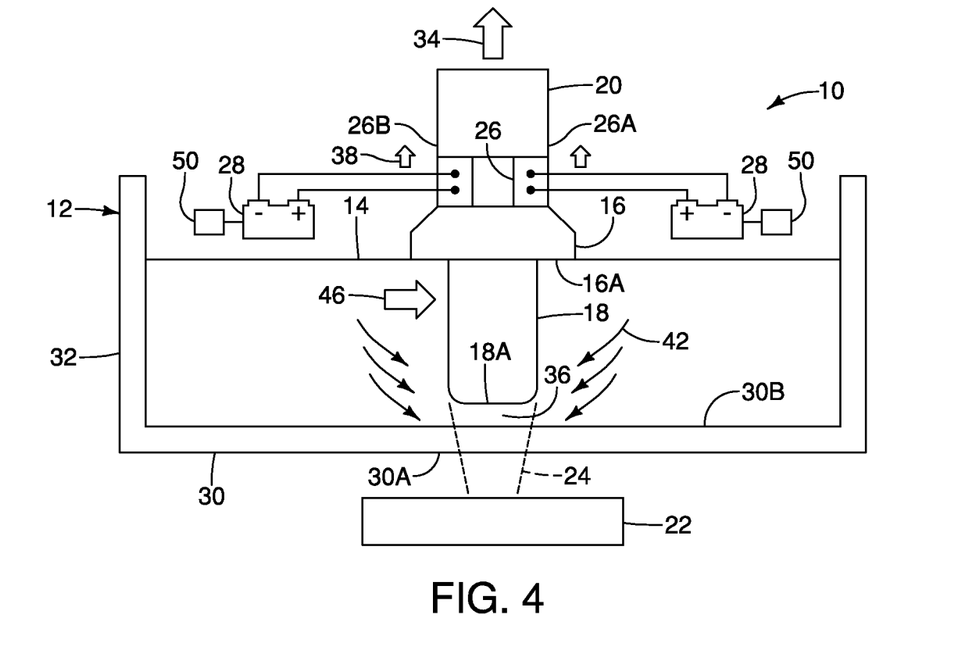
FIG. 4 is an elevational view of a three-dimensional printing system of FIG. 1 in which each of the actuators is deformed.

To offset the suction force and to increase the resin flow to the printing area 36, the piezoelectric stacks 26 are activated to increase the resin flow 42 to the printing area 36. The piezoelectric stacks 26 are initially in the second position. In other words, power is supplied from the power source 28 to the piezoelectric stacks 26 such that the piezoelectric stacks have a length of L+ΔL (i.e., the second position shown in FIG. 3B). As shown in FIG. 2, each of the piezoelectric stacks is maintained at the length L+ΔL. ΔL can be any suitable length, such as, but not limited to, between approximately 30 and 100 microns, inclusive. The supply of power from the power source 28 to each of the piezoelectric stacks 26 is then stopped, such that each of the piezoelectric stacks 26 reduces in length by ΔL, as shown in FIG. 4. The piezoelectric stacks 26 move in the direction indicated by arrow 38 in FIG. 4. Power is then supplied to each of the piezoelectric stacks 26, such that that each of the piezoelectric stacks 26 increases in length by ΔL, as shown in FIG. 2. The piezoelectric stacks 26 move in the direction indicated by arrow 40 in FIG. 2. The retraction in length of the piezoelectric stacks 26 retracts the rigid base 16, which induces resin flow to the printing area 36. The subsequent extension of the piezoelectric stacks 26 pushes the rigid base 16 in the downward direction, further inducing the resin flow 42 to the printing area 36. The oscillation, or extension and retraction of the piezoelectric stacks 26, facilitates the resin flow 42 to the printing area 36 such that a resin void is not formed in the printing area 36 and sufficient resin is present to print the next layer of the object 18. Each of the piezoelectric stacks 26, such as the first and second piezoelectric stacks 26A and 26B, are controlled to simultaneously retract and elongate. In other words, the plurality of piezoelectric stacks 26 are deformed to facilitate resin flow toward the printing area 36 between the printed object 18 and the base 30 of the tank 12.

When printing discrete layers, the piezoelectric stacks 26 can be retracted and extended once at the distance ΔL to facilitate resin flow 42 to the printing area 26. When continuously printing the printed object 18, the piezoelectric stacks 26 can be retracted and elongated at a predetermined frequency at a smaller distance (i.e., less than ΔL) to facilitate the resin flow 42 to the printing area 36. Alternatively, when printing discrete layers of the printed object 18, the piezoelectric stacks 26 can be retracted and elongated once at the distance ΔL to facilitate the resin flow 42 to the printing area 36.

Figure 5:
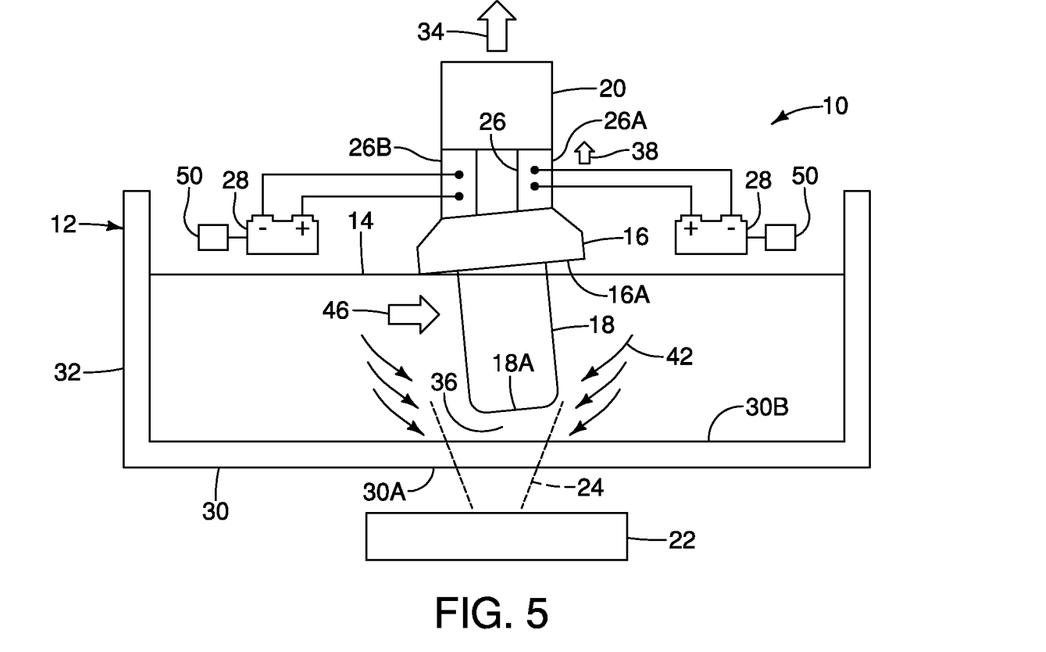
FIG. 5 is an elevational view of a three-dimensional printing system of FIG. 1 in which one of a plurality of actuators is deformed.

As shown in FIG. 5, each of the plurality of piezoelectric stacks 26 can be independently controlled. The first piezoelectric stack 26A is retracted. The second piezoelectric stack 26B is maintained in the elongated position. In other words, the supply of power from the power source 28 to the first piezoelectric stack 26A is stopped such that the first piezoelectric stack 26A has a length L, and the power source 28 supplies power to the second piezoelectric stack 26B such that the second piezoelectric stack 26B has a length L+ΔL. As shown in FIG. 5, the first piezoelectric stack 26A is in the first position, and the second piezoelectric stack 26B is in the second position. Independently controlling each of the piezoelectric stacks 26, as shown in FIG. 5, generates rotational movement of the rigid base, thereby increasing the resin flow 42 to the printing area 36. Resin flow introduced by the rotation of the rigid base 16 flows relative to the stagnant resin in the tank 14. The friction at the solid-liquid interface (between the base 30 of the tank 12 and the resin 14) produces fluid movement to increase the resin flow 42 toward the printing area 36.

The piezoelectric stacks 26 can be retracted and elongated at a predetermined frequency to induce shear stress in the resin 14, as shown in FIG. 2. In other words, the piezoelectric stacks 26 are deformed at the predetermined frequency to generate the shear stress in the resin 14 to reduce a viscosity of the resin 14. The shear stress can be used to reduce the viscosity of higher viscosity resins. Shear thinning is caused by the orderly movement of monomers in the resin caused by longer monomer chains aligning during movement of the resin.

The piezoelectric stacks 26 can also be deformed at a predetermined frequency to increase a temperature of the piezoelectric stacks 26. The increased temperature of the piezoelectric stacks 26 increases the temperature of the resin 14 and the rigid base 16. The increased temperature of the rigid base 16 further increases the temperature of the resin 14, which reduces the viscosity of the resin. The piezoelectric stacks 26 can be deformed at the predetermined frequency prior to starting the printing process such that the resin 14 in the tank 12 is pre-heated to facilitate the resin flow during the printed process.

The deformation, or vibration, of the piezoelectric stacks 26 results in vibration within the printed object 18. The vibration frequency of the piezoelectric stacks 26 can be tuned to the current mass of the printed object 18 for resonance vibration. During the printing process, the mass of the printed object 18 changes as each layer of the object 18 is printed. The vibration of the piezoelectric stacks 26 is changed to adjust for the increased mass of the printed object 18. In other words, the predetermined frequency of the deformation of the piezoelectric stacks is based on a current mass of the printed object 18. Adjusting the vibration frequency of the piezoelectric stacks 26 as the mass of the printed object 18 increases further facilitates resin flow, thereby increasing the printing speed.

A constant force is applied by the control arm 20 during the printing process. The piezoelectric stacks 26 generate electrical energy when displaced. The electrical energy generated by displacement of the piezoelectric stacks 26 can be monitored during the printing process. Variations in the constant force applied by the control arm 20 are indicated by the electrical energy generated by the piezoelectric stacks and reflect deviations from a mean force applied by the control arm 20. The variations in the mean force indicate difficulty in removing the printed object from the base 30 of the tank 12 or in detachment of the printed object 18 from the rigid base 16. A variation above a predetermined threshold of the mean force indicates that the printed object 18 is stuck to the base 30 of the tank 12. A variation below the predetermined threshold of the mean force indicates that the printed object 18 has detached from the rigid base 16. The printing process can be canceled when a variation outside the predetermined threshold is determined. The variations from the constant force applied by the control arm 20 determined by the piezoelectric stacks 26 can be used to determine replenishment intervals for the resin 14 and/or a lubricating oil disposed between the resin 14 and the base 30 of the tank 12.

Deformation of the actuator 26, as shown in FIGS. 1-8, increases resin flow 24 in the tank 12 to the printing area 36 to increase printing speeds.

As shown in FIGS. 9-12, a three-dimensional printing system 110 in accordance with another illustrated exemplary embodiment of the present invention is substantially similar to the 3D printing system 10 of the exemplary embodiment illustrated in FIGS. 1-8 except for the differences described below. Similar parts are identified with similar reference numerals, except increased by 100 (i.e., 1xx, accordingly).

An actuator 152 is connected to the tank 112, as shown in FIGS. 9-12. The actuator is preferably a piezoelectric stack 152. Preferably, a plurality of piezoelectric stacks 152 are connected to the tank 112.

A platform, or support, 146 is disposed beneath the tank 112. The platform 146 can have an aperture through which the light 124 emitted by the light source 122 passes. Alternatively, the platform 146 can include a transparent portion through which the light 124 emitted by the light source 122 passes.

The plurality of piezoelectric stacks 152 are disposed between the base 130 of the tank 112 and the platform 146. The plurality of piezoelectric stacks 152 are connected between an upper surface 146A of the platform 146 and a lower surface 130C of the base 130 of the tank 112, as shown in FIGS. 9-12. The piezoelectric stacks 152 are disposed between the light source 122 and the optically transparent window 130A in a direction in which the light 124 is emitted. The piezoelectric stacks 152 are disposed between the light source 122 and the rigid base 116 in a direction 122 in which the light is emitted. The actuator 152 operates substantially similarly to the actuator 26 of FIGS. 1-8.

Figure 10:
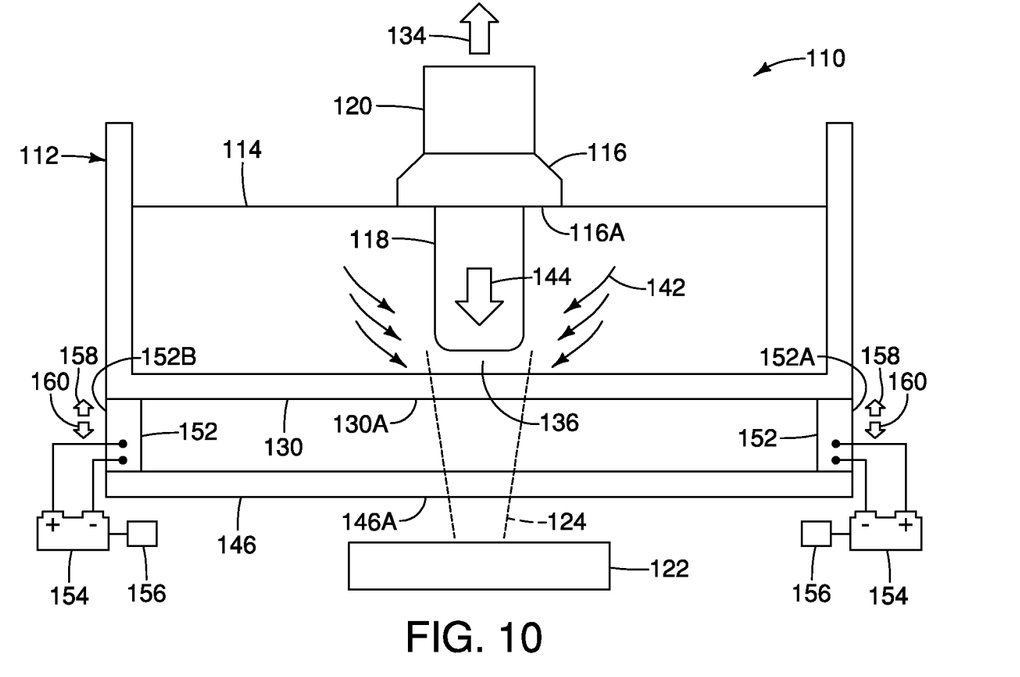
FIG. 10 an elevational view of the three-dimensional printing system of FIG. 9 including a power source connected to the actuator.
Figure 11:
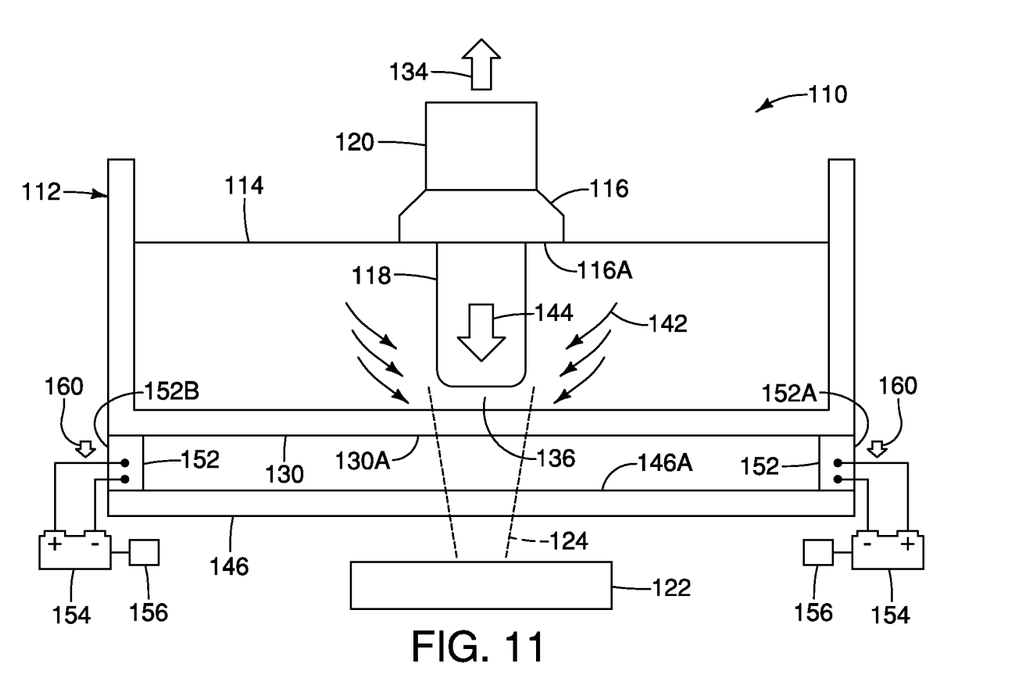
FIG. 11 is an elevational view of the three-dimensional printing system of FIG. 9 in which each actuator is deformed.
Figure 12:
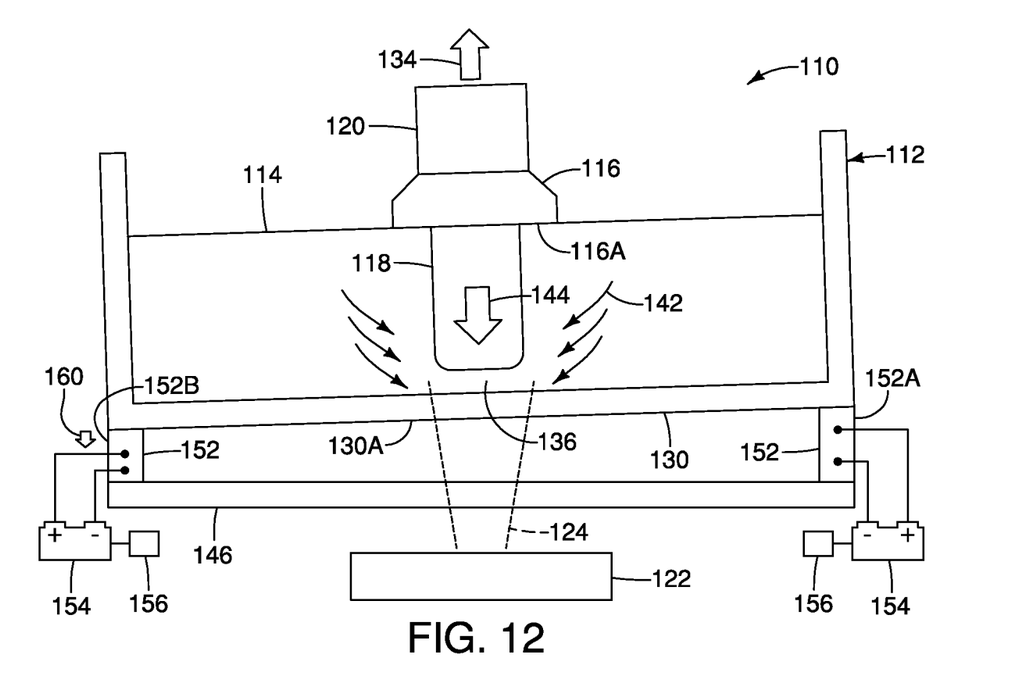
FIG. 12 is an elevational view of a three-dimensional printing system of FIG. 9 in which one of a plurality of actuators is deformed.

A power source 154 is electrically connected to each piezoelectric stack 152, as shown in FIGS. 10-12. A controller 256 is electrically connected to each power source 254 to control the supply of power by the power source 254. Supplying a voltage to the piezoelectric stack 152 from the power source 154 causes a deformation of the piezoelectric stack 152. The power source 154 is any suitable power source, such as a 120V battery. A controller 156 is connected to each power source 154 to control the supply of power to the piezoelectric stack 152. Alternatively, a single controller 156 can be connected to all the piezoelectric stacks 152.

As shown in FIG. 10, the piezoelectric stack 152 deforms in a first direction indicated by the arrow 158 when voltage is supplied from a power source 154, and retracts in a second direction indicated by an arrow 160 when the supply of voltage to the piezoelectric stack 126 is stopped. In other words, supplying voltage deforms the piezoelectric stack 126 by the longitudinal distance ΔL, and stopping the voltage supply returns the piezoelectric stack to the original, or default, length L. Deformation of the piezoelectric stacks 126 causes movement of the tank 112, as shown in FIGS. 9-12.

To offset the suction force 144 and to increase the flow of the resin 114 to the printing area 136, the piezoelectric stacks 152 are activated to increase the resin flow 142 to the printing area 136. The piezoelectric stacks 152 are initially in the second position, as shown in FIG. 10. In other words, power is supplied from the power source 154 to the piezoelectric stacks 152 such that the piezoelectric stacks have a length of L+ΔL (i.e., the second position shown in FIG. 3B). As shown in FIG. 10, each of the piezoelectric stacks is maintained at the length L+ΔL. ΔL can be any suitable length, such as, but not limited to, between approximately 30 and 100 microns, inclusive. Power from the power source 154 to each of the piezoelectric stacks 152 is then stopped, such that each of the piezoelectric stacks 152 reduces in length by ΔL, as shown in FIG. 11. Each of the piezoelectric stacks 152 deforms in the direction indicated by arrow 160 in FIG. 11, such that the tank 112 is moved closer to the platform 146. Power is then supplied to each of the piezoelectric stacks 152, such that that each of the piezoelectric stacks 152 increases in length by ΔL, as shown in FIG. 10. Each of the piezoelectric stacks 152 moves in the direction indicated by the arrow 158. The retraction in length of the piezoelectric stacks 152 moves the tank 112, which induces resin flow to the printing area 136. The subsequent extension of the piezoelectric stacks 152 further moves the tank 112 in the upward direction, further inducing the resin flow 142 to the printing area 136. The oscillation, or extension and retraction of the piezoelectric stacks 152, facilitates the resin flow 142 to the printing area 136 such that a resin void is not formed in the printing area 136 and sufficient resin is present to print the next layer of the object 118. Each of the piezoelectric stacks 152, such as the first and second piezoelectric stacks 152A and 156B, are controlled to simultaneously retract and elongate. In other words, the plurality of piezoelectric stacks 152 are deformed to facilitate resin flow toward the printing area 136 between the printed object 118 and the base 130 of the tank 112.

As shown in FIG. 12, each of the plurality of piezoelectric stacks 152 can be independently controlled. The first piezoelectric stack 152A is maintained in the elongated position. The second piezoelectric stack 26A is retracted. In other words, the supply of power from the power source 154 to the second piezoelectric stack 152B is stopped such that the second piezoelectric stack 152B has a length L, and the power source 154 supplies power to the first piezoelectric stack 152A such that the first piezoelectric stack 152A has a length L+ΔL. As shown in FIG. 12, the first piezoelectric stack 152A is in the second position, and the second piezoelectric stack 152B is in the second position. Independently controlling each of the piezoelectric stacks 152, as shown in FIG. 12, generates rotational movement of the tank 112, thereby increasing the resin flow 142 to the printing area 136.

Figure 13:
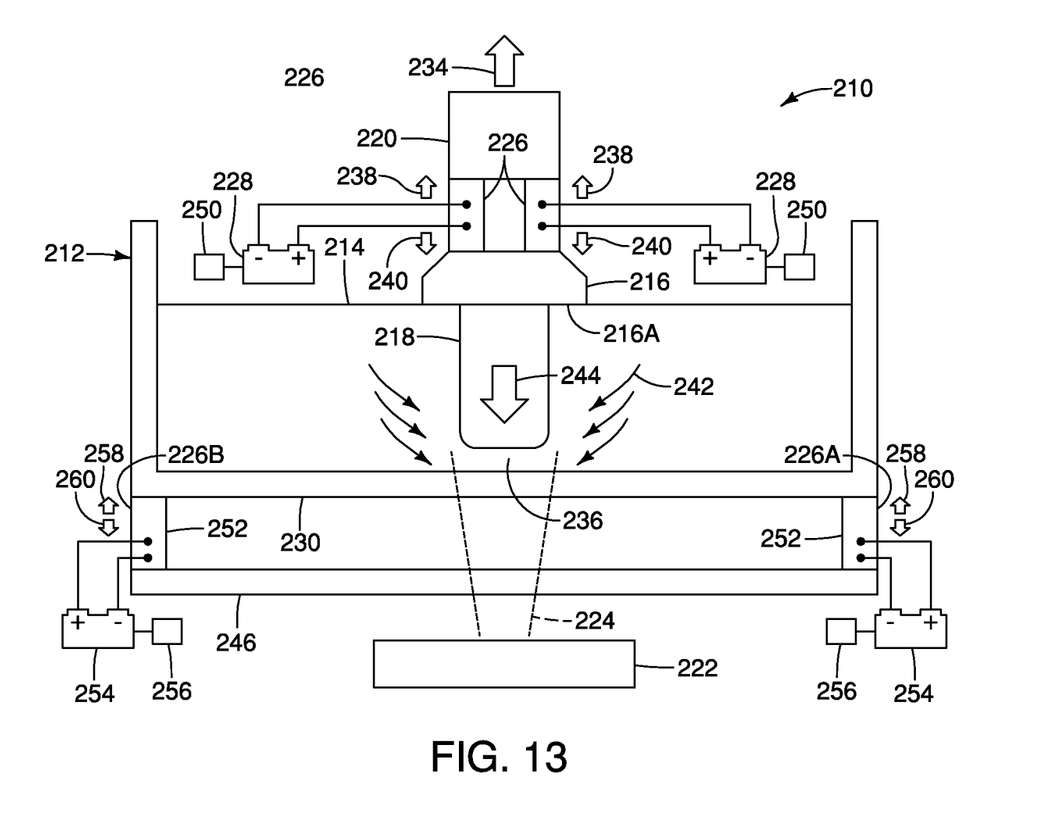
FIG. 13 is an elevational view of a three-dimensional printing system including a first actuator disposed between a rigid base and an arm and a second actuator connected to the tank in accordance with still another exemplary embodiment.

As shown in FIG. 13, a three-dimensional printing system 210 in accordance with another illustrated exemplary embodiment of the present invention is substantially similar to the three-dimensional printing systems 10 and 110 of the exemplary embodiments illustrated in FIGS. 1-12 except for the differences described below. Similar parts are identified with similar reference numerals, except increased by 200 (i.e., 2xx, accordingly).

At least one first actuator 226 is connected to the rigid base 116 and at least one second actuator 252 is connected to the tank 212, as shown in FIG. 13. Preferably, a plurality of first piezoelectric stacks 226 are connected between the rigid base 216 and the control arm 220, and a plurality of second piezoelectric stacks 252 are connected between a platform 246 and the base 230 of the tank 212. The first and second piezoelectric stacks 226 and 252 operate substantially similar to the actuators 26 of FIGS. 1-8 and the actuators 152 of FIGS. 9-12.

A power source 228 is electrically connected to each first piezoelectric stack 226, as shown in FIG. 13. A controller 250 is electrically connected to each power source 228 to control the supply of power by the power source 228. A power source 254 is electrically connected to each piezoelectric stack 252. A controller 256 is electrically connected to each power source 254 to control the supply of power by the power source 254.

Supplying a voltage to the first piezoelectric stack 226 from the power source 228 causes a deformation of the first piezoelectric stack 226. The power source 228 is any suitable power source, such as a 120V battery. A controller 250 is connected to each power source 228 to control the supply of power to the first piezoelectric stack 226. Alternatively, a single controller 250 can be connected to all the first piezoelectric stacks 226.

Supplying a voltage to the second piezoelectric stack 252 from the power source 254 causes a deformation of the second piezoelectric stack 252. The power source 254 is any suitable power source, such as a 120V battery. A controller 256 is connected to each power source 254 to control the supply of power to the second piezoelectric stack 252. Alternatively, a single controller 256 can be connected to all the second piezoelectric stacks 252.

As shown in FIG. 13, the first piezoelectric stack 226 deforms in a first direction indicated by the arrow 240 when voltage is supplied from a power source 228, and retracts in a second direction indicated by an arrow 238 when the supply of voltage to the first piezoelectric stack 226 is stopped. In other words, supplying voltage deforms the first piezoelectric stack 226 by the longitudinal distance ΔL, and stopping the voltage supply returns the first piezoelectric stack to the original, or default, length L. Deformation of the first piezoelectric stacks 226 causes movement of the rigid base 216.

As shown in FIG. 13, the second piezoelectric stack 252 deforms in a first direction indicated by the arrow 260 when voltage is supplied from a power source 254, and retracts in a second direction indicated by an arrow 258 when the supply of voltage to the second piezoelectric stack 252 is stopped. In other words, supplying voltage deforms the second piezoelectric stack 252 by the longitudinal distance ΔL, and stopping the voltage supply returns the second piezoelectric stack to the original, or default, length L. Deformation of the second piezoelectric stacks 252 causes movement of the tank 212.

To offset the suction force 244 and to increase the flow of the resin flow 214 to the printing area 236, the first and second piezoelectric stacks 226 and 252 are activated to increase the resin flow 242 to the printing area 236. As described above, the first and second piezoelectric stacks 226 and 252 are controllable to move the rigid base 216 and the tank 212, respectively, to facilitate resin flow 242 to the printing area 236.

General Interpretation of Terms

The controllers 50, 154, 250 and 254 preferably include a microcomputer with a control program that controls the supply of power from the power source as discussed above. The controllers can also include other conventional components, such as an input interface circuit, an output interface circuit, and storage devices, such as a ROM (Read Only Memory) device and a RAM (Random Access Memory) device. The microcomputer of the controllers are programmed to control the supply of power from the power sources. The memory circuit stores processing results and control programs, such as ones for the power supply operation and electrical field detection, that are run by the processor circuit. The controllers are operatively coupled to the power sources in a conventional manner. The internal RAM of the controllers store statuses of operational flags and various control data. The controllers are configured to selective control the power sources to control deformation of the actuators in accordance with the control programs.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a three-dimensional printing system equipped with the actuator. Accordingly, these terms, as utilized to describe the present invention should be interpreted relative to a three-dimensional printing system equipped with the actuator.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A three-dimensional printing system comprising:
    a tank containing a liquid photopolymer resin;
    an arm configured to be movable relative to the tank;
    a rigid base connected to the arm;
    a light source configured to emit light to the tank to form an object on the rigid base; and
    an actuator connected to at least one of the build plate and the tank, the actuator being configured to deform when power is supplied to the actuator.

2. The three-dimensional printing system according to claim 1, wherein
    the actuator is connected between the build plate and the arm.

3. The three-dimensional printing system according to claim 2, wherein
    the actuator is a plurality of piezoelectric stacks.

4. The three-dimensional printing system according to claim 3, wherein
    each of the plurality of piezoelectric stacks is configured to deform a predetermined distance from a first position to a second position when power is supplied thereto.

5. The three-dimensional printing system according to claim 4, wherein
    each of the plurality of piezoelectric stacks is configured to return from the second position to the first position when the supply of power is stopped.

6. The three-dimensional printing system according to claim 3, wherein
    each of the plurality of piezoelectric stacks is independently controllable.

7. The three-dimensional printing system according to claim 3, wherein
    the plurality of piezoelectric stacks are deformed to facilitate resin flow toward a printing area between the object and a base of the tank.

8. The three-dimensional printing system according to claim 3, wherein
    the plurality of piezoelectric stacks are deformed at a predetermined frequency to generate a shear stress in the resin to reduce a viscosity of the resin.

9. The three-dimensional printing system according to claim 8, wherein
    the predetermined frequency is based on a current mass of the object.

10. The three-dimensional printing system according to claim 3, wherein
    the plurality of piezoelectric stacks are deformed at a predetermined frequency to increase a temperature of the resin.

11. The three-dimensional printing system according to claim 3, wherein
    electrical energy generated by the plurality of piezoelectric stacks is monitored to determine adhesion of the object to the tank.

12. The three-dimensional printing system according to claim 3, wherein
    a number of the plurality of piezoelectric stacks is based on a final weight of the object to be printed.

13. The three-dimensional printing system according to claim 1, wherein
    the actuator is connected to the tank.

14. The three-dimensional printing system according to claim 13, wherein
    the actuator is a plurality of piezoelectric stacks.

15. The three-dimensional printing system according to claim 14, wherein
    the plurality of piezoelectric stacks are disposed between a platform and a base of the tank.

16. The three-dimensional printing system according to claim 15, wherein
    each of the plurality of piezoelectric stacks is configured to move a predetermined distance from a first position to a second position when power is supplied thereto.

17. The three-dimensional printing system according to claim 15, wherein
    each of the plurality of piezoelectric stacks is configured to return from the second position to the first position when the supply of power is stopped.

18. The three-dimensional printing system according to claim 15, wherein
    each of the plurality of piezoelectric stacks is independently controllable.

19. The three-dimensional printing system according to claim 14, wherein
    the plurality of piezoelectric stacks are deformed to facilitate resin flow toward a printing area between the object and a base of the tank.

20. The three-dimensional printing system according to claim 14, wherein
    the plurality of piezoelectric stacks are disposed between the light source and the rigid base.

* * * * *